(12) United States Patent
Tsumura et al.

(10) Patent No.: US 7,470,457 B2
(45) Date of Patent: *Dec. 30, 2008

(54) CURABLE COMPOSITION, COMPOSITION FOR OPTICAL MATERIAL, OPTICAL MATERIAL, LIQUID-CRYSTAL DISPLAY DEVICE, TRANSPARENT CONDUCTIVE FILM, AND PROCESS FOR PRODUCING THE SAME

(75) Inventors: Manabu Tsumura, Settsu (JP); Katsuya Ouchi, Settsu (JP); Kazunori Yokoyama, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/239,777

(22) PCT Filed: Apr. 20, 2001

(86) PCT No.: PCT/JP01/03429

§ 371 (c)(1),
(2), (4) Date: Sep. 25, 2002

(87) PCT Pub. No.: WO01/81475

PCT Pub. Date: Nov. 1, 2001

(65) Prior Publication Data

US 2003/0144420 A1 Jul. 31, 2003

(30) Foreign Application Priority Data

| Apr. 21, 2000 | (JP) | ................................ 2000-120421 |
| Jun. 26, 2000 | (JP) | ................................ 2000-190950 |
| Jul. 10, 2000 | (JP) | ................................ 2000-207695 |
| Jul. 10, 2000 | (JP) | ................................ 2000-207696 |

(51) Int. Cl.
*G02F 1/1333* (2006.01)

(52) U.S. Cl. .................... 428/1.6; 428/1.52; 349/158; 525/478

(58) Field of Classification Search ........ 428/1.32–1.33, 428/1.52, 1.55, 1.6; 349/158; 525/478–479, 525/331.9, 332.8, 333.2, 914

See application file for complete search history.

(56) References Cited

U.S. PATENT DOCUMENTS 2,624,721 A * 1/1953 Hatcher et al. ............. 528/34

(Continued)

FOREIGN PATENT DOCUMENTS

CA          2 297 068 A1      11/1999

(Continued)

OTHER PUBLICATIONS

Kazuyoshi. et al., Jun. 1, 1998, English Machine Translation of JP 10-003270.*

*Primary Examiner*—Keith D. Hendricks
*Assistant Examiner*—Sophie Hon
(74) *Attorney, Agent, or Firm*—Sughrue Mion, PLLC (57) ABSTRACT

A curable composition comprising: component (A), which is an aliphatic organic compound including at least two carbon-carbon double bonds within one molecule, the at least two carbon-carbon double bonds having reactivity with an SiH group; component (B), which is a compound including at least two SiH groups within one molecule; and component (C), which is a hydrosilylation catalyst. The curable composition can be made into an optical material by being previously mixed so as to allow the carbon-carbon double bonds having reactivity with an SiH group to react with some or all of the SiH groups in the composition, thereby causing curing. There is provided a curable composition having a high heat-resistance, a low birefringence, a small coefficient of photo-elasticity, a high optical transparency, and toughness; an optical material; a method for producing the same; and a liquid crystal display device incorporating the same.

3 Claims, 1 Drawing Sheet

U.S. PATENT DOCUMENTS

| | | | |
|---|---|---|---|
| 3,439,014 A * | 4/1969 | Patton et al. | 556/450 |
| 3,892,643 A | 7/1975 | Tanaka et al. | |
| 4,902,731 A * | 2/1990 | Leibfried | 523/222 |
| 5,077,134 A * | 12/1991 | Leibfried, Sr. | 428/447 |
| 5,101,029 A * | 3/1992 | Stapp et al. | 544/221 |
| 5,166,298 A * | 11/1992 | Friedmann et al. | 528/27 |
| 5,204,384 A * | 4/1993 | Matsushita et al. | 523/211 |
| 5,208,289 A * | 5/1993 | Takarada et al. | 525/100 |
| 5,340,872 A * | 8/1994 | Inoue et al. | 524/588 |
| 5,409,995 A * | 4/1995 | Iwahara et al. | 525/100 |
| 5,605,726 A * | 2/1997 | Gibbons et al. | 428/1.23 |
| 5,623,030 A * | 4/1997 | Tsumura et al. | 525/478 |
| 5,691,433 A * | 11/1997 | Kotani et al. | 528/15 |
| 5,773,532 A * | 6/1998 | Okaniwa et al. | 525/479 |
| 5,981,679 A * | 11/1999 | Takei et al. | 528/15 |
| 5,993,690 A * | 11/1999 | Kondo et al. | 252/299.6 |
| 6,093,782 A * | 7/2000 | Herzig et al. | 528/15 |
| 6,129,980 A * | 10/2000 | Tsukada et al. | 428/327 |
| 6,303,728 B1 * | 10/2001 | Hagimori et al. | 528/15 |

FOREIGN PATENT DOCUMENTS

| | | |
|---|---|---|
| JP | 50-000100 A | 1/1975 |
| JP | 06-080882 A | 3/1994 |
| JP | 06-207104 A | 7/1994 |
| JP | 07-149899 A | 6/1995 |
| JP | 09-291214 A | 11/1997 |
| JP | 10-003270 A | 1/1998 |
| JP | 10-176110 A | 6/1998 |
| JP | 2000-063672 A | 2/2000 |
| WO | WO 99/24509 A1 | 5/1999 |

* cited by examiner

CURABLE COMPOSITION, COMPOSITION FOR OPTICAL MATERIAL, OPTICAL MATERIAL, LIQUID-CRYSTAL DISPLAY DEVICE, TRANSPARENT CONDUCTIVE FILM, AND PROCESS FOR PRODUCING THE SAME

TECHNICAL FIELD

The present invention relates to a curable composition, and in particular to a curable composition from which an optical material having high heat-resistance, high optical transparency, and toughness can be obtained.

By using the curable composition according to the present invention, various optical materials can be produced, e.g., members to be used in liquid crystal display devices; transparent conductive films to be suitably used as input devices for portable information terminals, car navigation systems, and the like; and plastic film liquid crystal display devices to be suitably used as displays for mobile phones, portable information terminals, personal computers, and the like, which are strongly desired to become lighter in weight and thinner in size.

BACKGROUND ART

As optical materials such as those for liquid crystal display devices, materials which have a low birefringence, a small coefficient of photoelasticity, and a high optical transparency are used. In the case of materials for liquid crystal display devices and the like, any materials used therein are required to have a high heat-resistance from the perspective of the manufacturing process. Glass and the like have conventionally been used as materials satisfying such requirements.

Optical materials such as those for liquid crystal display devices are generally used in the form of thin films or thin tubes or rods. Recent market requirements have called for the use of even thinner films and thinner tubes or rods. However, since the conventionally-used glass is brittle in terms of strength, it can only be used for a limited scope of use.

One example of materials having toughness is polymer materials. However, in the case of a thermoplastic resin, for example, introducing an aromatic skeleton into its molecule for allowing a high heat-resistance to be exhibited generally results in a high birefringence and a large coefficient of photoelasticity, thus making the reconciliation of high heat-resistance and optical characteristics difficult. As for thermosetting resins, conventionally known thermosetting resins are generally colored and therefore not suitable for optical material applications. Furthermore, thermosetting resins are generally polarized, which is disadvantageous for the exhibition of optical performance.

(Cases Where a Curable Composition is Used as a Transparent Conductive Film)

Transparent conductive films are plastic films which are transparent and conductive, and are functional films which are utilized in technological fields where light and electricity are involved. With recent advancements in electronics, reduction in weight, size, cost of parts and devices for which transparent conductive films are employed are desired, along with increased design flexibility and higher performance. For both conventional applications and new applications, transparent conductive films are expected to have improved functions.

Transparent conductive films are required to have a high light transmittance. In applications such as liquid crystal display and optical recording, optical characteristics such as birefringence are also regarded as important. As conventional transparent conductive films, those based on a substrate of polyester (hereinafter abbreviated as "PET") films or polycarbonate (hereinafter abbreviated as "PC") films, with a thin metal film or a thin semiconductor film such as ITO formed on the surface thereof, are known.

A transparent conductive film whose substrate is a PET film has a large optical anisotropy because the PET film has a molecular orientation due to a stretching operation performed during the manufacture thereof, thereby being inferior in birefringence. A transparent conductive film whose substrate is a PC film exhibits a large polarization anisotropy because the PC includes a group having a substantial polarization rate, e.g., a benzene ring, within its molecule, and therefore is likely to have birefringence.

Thus, conventional transparent conductive films have their advantages and disadvantages, and cannot necessarily be considered as satisfying the higher-level and more-complicated requirements of the recent years.

(Cases Where a Curable Composition is Used as a Component Material for a Liquid Crystal Display Device)

In recent years, liquid crystal display devices have faced some sophisticated requirements, e.g., they are required to be in a thinner film configuration, lighter in weight, larger in size, shaped arbitrarily, and capable of displaying on a curved surface. In particular, in answer to the expanded use of devices which are carried on one's body, e.g., mobile phones, electronic organizers, and pen input devices, liquid crystal display panels employing plastic substrates, as opposed to conventionally-employed glass substrates, have been contemplated and partly begun to be put to practical use. For example, polyethersulfone (hereinafter abbreviated as "PES") and polycarbonate (PC) film substrates, which do not exhibit optical anisotropy, are available.

Plastic film substrates need to satisfy requirements such as capability to lose optical anisotropy, heat-resistance, solvent-resistance, gas barrier property, surface flatness, geometrical stability, and translucency. The aforementioned PES exhibits an increased substrate retardation when formed with a thickness of 0.1 mm or above. An increased substrate retardation leads to an increased retardation of the entire liquid crystal display device, a coloration phenomenon, and the like, thus unfavorably affecting the display quality of the liquid crystal display device. Since PES has a heat-resistance of up to 150° C., the component materials of a liquid crystal display device must be subjected to low-temperature sintering. The aforementioned PC also exhibits an increased substrate retardation when formed with a thickness of 0.1 mm or above, resulting in problems similar to those associated with PES.

DISCLOSURE OF THE INVENTION

In order to solve the aforementioned problems, the inventors conducted vigorous research to find that the aforementioned problems can be solved by employing a curable composition comprising as essential components: an organic compound including at least two carbon-carbon double bonds within one molecule, the at least two carbon-carbon double bonds having reactivity with an SiH group; and a silicon compound including at least two SiH groups within one molecule, thereby arriving at the present invention.

Specifically, a curable composition according to the present invention comprises: component (A), which is an aliphatic organic compound including at least two carbon-carbon double bonds within one molecule, the at least two carbon-carbon double bonds having reactivity with an SiH group; component (B), which is a compound including at least two SiH groups within one molecule; and component (C), which is a hydrosilylation catalyst.

In one embodiment, at least one of the carbon-carbon double bonds included in component (A) is a vinyl group or an allyl group.

In one embodiment, component (A) is 1,2-polybutadiene, hydrogenated bisphenol A diallylether, 4-vinylcyclohexene, or 1,2,4-trivinylcyclohexane.

A composition for an optical material according to the present invention employs the aforementioned curable composition.

In one embodiment, the optical material is a film for use with liquid crystal.

In one embodiment, the optical material is a plastic cell for use with liquid crystal.

An optical material according to the present invention is obtained by mixing the aforementioned curable composition so as to allow the carbon-carbon double bonds included in component (A) to react with some or all of the SiH groups included in component (B), thereby causing curing.

A method for producing an optical material according to the present invention comprises the steps of: mixing the aforementioned composition for an optical material; and allowing the carbon-carbon double bonds included in component (A) to react with some or all of the SiH groups included in component (B).

A liquid crystal display device according to the present invention incorporates the aforementioned optical material.

A transparent conductive film according to the present invention comprises a transparent film composed of the cured aforementioned curable composition, and a transparent conductive layer provided on at least one surface of the transparent film.

A method for producing a transparent conductive film according to the present invention comprises producing the aforementioned transparent conductive film with a molding die.

In one embodiment, the molding die is made of glass whose surface is polished.

In one embodiment, the molding die comprises a polished hard-stainless steel plate.

In one embodiment, the method comprises producing the transparent conductive film by a solution flow method.

A plastic film liquid crystal display device according to the present invention comprises a liquid crystal layer interposed between a pair of plastic film substrates, wherein one or both of the substrates are obtained by curing the aforementioned curable composition.

In one embodiment, the liquid crystal display layer is of a super twisted nematic type.

In one embodiment, the substrates used for the liquid crystal display device are produced with a molding die.

In one embodiment, the molding die is made of glass whose surface is polished.

In one embodiment, the molding die comprises a polished hard-stainless steel plate.

In one embodiment, the method comprises producing the plastic film substrates used for the liquid crystal display device by a solution flow method.

Materials which are produced from the composition of the present invention have low birefringence and high optical transparency as well as toughness, and therefore are suitable as optical materials.

Since transparent conductive films which are produced from the composition of the present invention have low retardation and high optical transparency, they can be used for applications requiring sophisticated and complicated properties as in the electronics fields.

Plastic film liquid crystal display device substrate materials which are produced from the composition of the present invention have low retardation and high optical transparency, and therefore are suitable as plastic film liquid crystal display device substrate materials.

BEST MODES FOR CARRYING OUT THE INVENTION

Hereinafter, the present invention will be described in detail.

(Component (A))

First, component (A) according to the present invention will be described.

Component (A) is an aliphatic organic compound including at least two carbon-carbon double bonds within one molecule, the at least two carbon-carbon double bonds having reactivity with an SiH group.

In the case where component (A) has an organic skeleton, the organic skeleton is preferably a skeleton only containing C, H, N, O, S, and a halogen as component elements thereof. In the case where an organic skeleton containing a siloxane unit (Si—O—Si), e.g., a polysiloxane-organic block copolymer or a polysiloxane-organic graft copolymer, is used, the gas permeability is likely to be increased, thus resulting in the deterioration of the liquid crystal material due to permeation of steam or oxygen, or the so-called "repellence" problem may occur, i.e., when a surface coating is performed, the contact angle of the coating material may be increased so that the coating material is repelled to prevent thin film coating.

When the structure of component (A) is represented as a skeletal portion and a group (alkenyl group) which is bound to the skeleton via a covalent bond (and optionally via a divalent or higher substituent) and which includes carbon-carbon double bonds having reactivity with an SiH group, the alkenyl group may be present anywhere within the molecule.

As the skeleton of component (A), which is an organic compound, there is no particular limitation so long as it is aliphatic. An organic polymeric skeleton or an organic monomeric skeleton may be used. In the present specification, "aliphatic" is used in the sense of excluding aromatic organic compounds, and thus encompasses alicyclic compounds as well.

As examples of organic polymeric skeletons include polyether-base, polyester-base, polyarylate-base, polycarbonate-base, saturated hydrocarbon-base, polyacrylic ester-base, polyamide-base, and polyimide-base skeletons may be used.

Examples of monomeric skeletons include, for example, aliphatic hydrocarbon-base, alicyclic-base, and mixtures thereof.

As for the alkenyl group in component (A), there is no particular limitation so long as it has reactivity with an SiH group. However, an alkenyl group represented by the following general formula (I):

(I)

(where $R^1$ represents a hydrogen atom or a methyl group; in this case, each $R^1$ may be the same or different) is preferable in terms of reactivity. From the perspective of availability of the material, is especially preferable.

As the alkenyl group in component (A), an alkenyl group represented by the following general formula (II):

(II)

(where $R^1$ represents a hydrogen atom or a methyl group) is preferable due to the high heat-resistance of the resultant cured substance. From the perspective of availability of the material, is especially preferable.

The alkenyl group may be covalently bound to the skeletal portion of component (A) via a divalent or higher substituent. As the divalent or higher substituent, there is no particular limitation so long as it is a substituent having 0 to 10 carbons. However, the divalent or higher substituent preferably only contains C, H, N, O, S, and a halogen as component elements thereof, for the same reason that the skeleton of component (A) preferably only contains C, H, N, O, S, and a halogen as component elements thereof. Examples of such substituents include:

-continued (where n represents any number from 1 to 10)

(where n represents any number from 0 to 4)

Two or more of such divalent or higher substituents may be linked via a covalent bond to compose one divalent or higher substituent.

Examples of groups which are covalently bound to such a skeletal portion include: a vinyl group; an allyl group: a methallyl group; an acryl group; methacryl group; a 2-hydroxy-3-(allyloxy)propyl group; a 2- (allyloxy)ethyl group; a 2,2-bis (allyloxymethyl)butyl group; a 3-(allyloxy)-2,2-bis (allyloxymethyl)propyl group, and $$CH_2=CH-CH_2-(O-CH_2-CH)_n$$

(where n represents a number satisfying $5 \geq n \geq 2$)

(where R represents a divalent group selected from

)

(where n represents any number from 0 to 4)

As component (A), a low molecular weight compound which is not representable as a skeletal portion and an alkenyl group in the above manner may also be used. Specific examples of such low molecular weight compounds include: aliphatic chain polyene compounds such as butadiene, isoprene, octadiene, and decadiene; alicyclic polyene compounds such as cyclopentadiene, cyclooctadiene, dicyclopentadiene, tricyclopentadiene, and norbornadiene; substituted alicyclic olefin compounds such as vinylcyclopentene and vinylcyclohexene; and alicyclic compounds such as 1,2,4-trivinylcyclohexane.

Among these instances of component (A), α,ω-diene compounds such as decadiene are not preferable because they are likely to result in brittle cured substances with inferior mechanical properties.

As component (A), those which do not include an internal olefin structure are preferable. In the case where an internal olefin structure is included, the internal olefin structure is likely to be left unreacted after hydrosilylation curing reaction, thereby resulting in poor photo-deterioration properties. As used herein, an "internal olefin structure" refers to the structure:

where one or both of $R^1$ and $R^2$ are substituents which are not hydrogen atoms and one or both of $R^3$ and $R^4$ are substituents which are not hydrogen atoms.

-continued (where R represents a divalent group selected from $$-O-, \quad -CH_2-, \quad -\overset{CH_3}{\underset{CH_3}{C}}-, \quad -\overset{CF_3}{\underset{CF_3}{C}}-, \quad -\overset{O}{\underset{O}{S}}-)$$

and the like.

The number of carbon-carbon double bonds having reactivity with an. SiH group included in component (A) is at least two per molecule. In order to provide further improved heat-resistance, the number is preferably more than two, and more preferably three or more, and especially preferably four or more. In the case where the number of carbon-carbon double bonds having reactivity with an SiH group included in component (A) per molecule of component (A) is equal to or less than one per molecule, only a graft structure results through reaction with component (B), without achieving a cross-linked structure.

As component (A), those having fluidity at a temperature of 100° C. or less are preferable in order to obtain homogeneous mixing with other components and good workability. Component (A) may be linear or branched. Although there is no particular limitation as to the molecular weight, any value from 50 to 100,000 can be suitably used. If the molecular weight exceeds 100,000, the material generally exhibits a high viscosity, thus detracting from workability, and the effects of cross-linking due to reaction between the alkenyl group and the SiH group become difficult to be exhibited.

In order to further enhance the reactivity with component (B), preferably at least one, and more preferably at least two, of the carbon-carbon double bonds having reactivity with an SiH group which are included in the organic compound which is component (A) are vinyl groups.

In order to further enhance the reactivity with component (B), preferably at least one, and more preferably at least two, of the carbon-carbon double bonds having reactivity with an SiH group which are included in the organic compound which is component (A) are allyl groups.

From the perspective of industrial availability, specific examples of preferable component (A) include 1,2-polybuta- As component (A), those containing carbon-carbon double bonds having reactivity with an SiH group in an amount equal to or greater than 0.001 mol per gram of component (A) may be used in order to provide further improved heat-resistance. Those containing the same in an amount equal to or greater than 0.005 mol per gram of component (A) are preferable, and those containing the same in an amount equal to or greater than 0.008 mol per gram of component (A) are especially preferable. Specific examples include: butadiene, isoprene, vinylcyclohexene, cyclopentadiene, dicyclopentadiene, cyclohexadiene, decadiene, diallylphthalate, trimethylolpropanediallylether, pentaerythritoltriallylether, and oligomers thereof, 1,2-polybutadiene (with a 1,2 ratio of 10 to 100%, and preferably 50 to 100%), diene, hydrogenated bisphenol A diallylether, 4-vinylcyclohexene, cyclopentadiene, or 1,2,4-trivinylcyclohexane.

(Component (B))

Next, component (B), which is a silicon compound having at least two SiH groups in one molecule, will be described.

There is no particular limitation as to the compound having SiH groups which can be used in the present invention. For example, a compound as disclosed in International Laid-Open Publication No. WO96/15194 which includes at least two SiH groups within one molecule may be used, among others.

Among these, chain and/or cyclic polyorganosiloxanes including at least two SiH groups within one molecule are preferable in terms of availability. For good compatibility with component (A), cyclic polyorganosiloxanes including at least two SiH groups within one molecule which can be represented by the following general formula (III):

(III)

(where $R^2$ represents an organic group having 1 to 6 carbons; and n represents any number from 3 or 10) are more preferable. For good industrial availability, the substituent $R^2$ in the compound which can be represented by general formula (III) is preferably a substituent which is composed of C, H, and O, and more preferably a hydrocarbon group.

In order to attain good compatibility with the aforementioned component (A), component (B) is preferably are action product between a chain and/or cyclic polyorganosiloxane including at least two SiH groups within one molecule (hereinafter referred to as component (D)) and one or more kinds of compounds selected from the group consisting of organic compounds including carbon-carbon double bonds (hereinafter referred to as component (E)). In this case, a compound having an SiH group (component (B)) can be obtained from hydrosilylation reaction between excess of component (D) and a relatively small amount of component (E).

Specific preferable examples of component (E) include allylether of novolac phenol and bisphenol A diallylether, 2,2'-diallylbisphenol A, diallylphthalate, bis(2-allyloxyethyl) ester of phthalic acid, styrene, α-methylstyrene, and the like because they can enhance the compatibility of component (B) with component (A). One kind or a mixture of two or more kinds may be used as the organic compound of component (E).

Each of various instances of component (B) described above can be used alone or they may be used as a mixture of two more kinds.

The mixing ratio between component (A) and component (B) is not particularly limited so long as the necessary strength is not lost. However, it is generally preferable that a ratio between the number of mols (X) representing the number of carbon-carbon double bonds having reactivity with an SiH group in component (A) and the number of mols (Y) representing the number SiH groups in component (B) is $2 \geq Y/X \geq 0.5$. If $Y/X > 2$ or $0.5 > Y/X$, sufficient curing properties cannot be obtained, so that sufficient strength may not be obtained and poor heat-resistance may result.

(Hydrosilylation Catalyst)

Next, a hydrosilylation catalyst, which is component (C), will be described.

As for the hydrosilylation catalyst, there is no particular limitation so long as catalytic activity is obtained. For example, platinum alone; solid platinum carried by a carrier such as aluminas, silica, or carbonblack; platinic chloride; a complex of platinic chloride and alcohols, aldehydes, ketones, etc.; a platinum-olefin complex (e.g., Pt(CH$_2$=CH$_2$)$_2$(PPh$_3$)$_2$ or Pt(CH$_2$=CH$_2$)$_2$Cl$_2$), platinum-vinylsiloxane complex (e.g., Pt(ViMe$_2$SiOSiMe$_2$Vi)$_n$, Pt[(MeViSiO)$_4$]$_m$], a platinum-phosphine complex (e.g., Pt(PPh$_3$)$_4$ or Pt(PBu$_3$)$_4$); a platinum-phosphite complex (e.g., Pt[P(OPh)$_3$]$_4$ or Pt[P(OBu)$_3$]$_4$) (where Me represents a methyl group; Bu represents a butyl group; Vi represents a vinyl group; Ph represents a phenyl group; and n and m represent integers); dicarbonyldichloro platinum; Karstedt catalyst; a platinum-hydrocarbon composite described in the specifications of U.S. Pat. Nos. 3,159,601 and 3,159,662 to Ashby; and a platinum alcoholate catalyst described in the specification of U.S. Pat. No. 3,220,972 to Lamoreaux. Furthermore, a platinum chloride-olefin composite described in the specification of U.S. Pat. No. 3,516,946 to Modic is also useful in the present invention.

Examples of catalysts other than platinum compounds include RhCl(PPh)$_3$, RhCl$_3$, RhAl$_2$O$_3$, RuCl$_3$, IrCl$_3$, FeCl$_3$, AlCl$_3$, PdCl$_2$.2H$_2$O, NiCl$_2$, TiCl$_4$, and the like.

Among these, platinic chloride, a platinum-olefin complex, a platinum-vinylsiloxane complex and the like are preferable from the perspective of catalytic activity. Such a catalyst may be used alone or two or more kinds may be used together.

There is no particular limitation as to the amount of catalyst to be added. However, in order to provide sufficient curing properties and maintain the cost of the curable composition relatively low, a range of $10^{-1}$ to $10^{-8}$ mols per mol of an SiH group is preferable, and a range of $10^{-2}$ to $10^{-6}$ mols is more preferable.

An auxiliary catalyst can be used together with the aforementioned catalyst. For example, phosphorous compounds such as triphenylphosphine; 1,2-diester compounds such as dimethylmaleate: acetylene alcohol compounds such as 2-hydroxy-2-methyl-1-butyne; sulfur compounds such as sulfur alone; and amine compounds such as triethylamine. There is no particular limitation as to the amount of auxiliary catalyst to be added. However, a range of $10^{-2}$ to $10^2$ mols per mol of the catalyst is preferable, and a range of $10^{-1}$ to 10 mols is more preferable.

(Additives and the Like)

In order to further improve the storage stability of the curable composition of the present invention, or adjust the reactivity of the hydrosilylation reaction during the manufacture process, a curing retarder can be used.

Examples of curing retarders include compounds containing aliphatic unsaturated bonds, organic phosphorous compounds, organic sulfur compounds, nitrogen-containing compounds, tin compounds, organic peroxides and the like, which may be used in combination. Examples of compounds containing aliphatic unsaturated bonds include propargyl alcohols, en-in compounds, maleates, and the like. Examples of organic phosphorous compounds include triorganophosphines, diorganophosphines, organophosphones, triorganophosphites, and the like. Examples of organic sulfur compounds include organomercaptans, diorganosulfides, hydrogen sulfide, benzothiazol, benzothiazoldisulfide, and the like. Examples of nitrogen-containing compounds include ammonia, primary to tertiary alkylamines, arylamines, urea, hydrazine, and the like. Examples of tin compounds include halogenated tin (II) dihydrate, tin (II) carboxylate, and the like. Examples of organic peroxides include di-t-butylperoxide, dicumylperoxide, benzoylperoxide, t-butyl perbenzoate, and the like.

Among these curing retarders, benzothiazol, thiazol, dimethylmaleate, and 3-hydroxy-3-methyl-1-butyne are preferable because of their good retardation activity and good availability of these materials.

The amount of a storage stability enhancer to be added is preferably in the range of $10^{-1}$ to $10^3$ mols per mol of the hydrosilylation catalyst to be used, and more preferably the range of 1 to 50 mols.

As the composition of the present invention, various combinations can be used as described above. However, for good heat-resistance, those compositions which are cured to give a cured substance whose Tg is 50° C. or more are preferable; those compositions which are cured to give a cured substance whose Tg is 100° C. or more are more preferable; and those compositions which are cured to give a cured substance whose Tg is 150° C. or more are especially preferable.

An inorganic filler may be added to the composition of the present invention as necessary. The addition of an inorganic filler is effective for preventing the composition from having fluidity, and for strengthening the material. As the inorganic filler, those which are fine particles are preferable so as not to deteriorate the optical characteristics, examples thereof including: alumina, aluminum hydroxide, molten silica, crystalline silica, superfine powder amorphous silica, hydrophobic superfine powder silica, talc, barium sulfate, and the like.

Various resins can be added in order to reform the characteristics of the composition according to the present invention. As for resins, for example, polycarbonate resin, polyethersulfone resin, polyarylate resin, epoxy resin, cyanate resin, phenol resin, acrylic resin, polyimide resin, polyvinyl acetal resin, urethane resin, and polyester resin may be used; however the resins are not limited thereto.

Otherwise, anti-aging agents, radical inhibitors, ultraviolet absorbents, adhesion modifiers, flame retardants, surfactants, storage stability enhancers, ozone degradation preventing agents, photostabilizers, thickeners, plasticizers, coupling agents, antioxidants, thermostabilizers, conductivity conferrers, antistatic agents, radiation shield agents, nucleating agents, phosphorous-base peroxide decomposers, slip additives, pigments, metal deactivators, physicochemical property adjusters, and the like may be added to the composition according to the present invention to an extent where the purposes and effects of the present invention are not undermined.

(Mixing and Molding Methods for the Curable Composition)

The curable composition according to the present invention can be made into an optical material by being previously mixed so as to allow the carbon-carbon double bonds having reactivity with an SiH group to react with some or all of the SiH groups in the composition, thereby causing curing.

When the composition is allowed to react and cure, necessary amounts of components (A), (B), and (C) may be allowed to react by being mixed at one time. Alternatively, a method may be adopted in which some of these are mixed and allowed to react, and thereafter the remainders are mixed for further reaction. Alternatively, a method may be adopted in which only some of the functional groups within the composition are allowed to react (to enter a "B stage") by controlling the reaction conditions after mixing or utilizing differences in reactivity between the respective functional groups (in the case where a compound which contains functional groups having a relatively high reactivity and functional groups having a relatively low reactivity is used), and thereafter performing a process such as molding for further curing. According to these methods, viscosity adjustment at the time of molding can be facilitated.

In other words, various methods can be adopted as a mixing method, but methods in which component (B) is admixed to a mixture resulting from admixing component (C) to component (A) are preferable. In the case where a method is adopted in which component (A) is admixed to a mixture resulting from admixing component (C) to component (B), alteration in quality may occur during storage because component (B) has reactivity with water in the presence of component (C).

As the method for causing curing, the reaction may be effected by simple mixing, or the reaction may be effected by heating. A method which involves reaction by heating is preferable because it provides for a quick reaction and a material having a high heat-resistance is generally likely to be obtained.

The reaction temperature can be set to be various values. For example, a temperature in the range of 30 to 300° C. can be used; 100 to 250° C. is more preferable; and 150 to 200° C. is still more preferable. If the reaction temperature is lower, the reaction time required for causing sufficient reaction becomes long. If the reaction temperature is higher, the molding process is likely to become difficult.

The reaction may be performed at a constant temperature, but the temperature may be changed in multiple levels or continuously.

The reaction time may also be set to be various values.

The pressure during the reaction can also be set to be various values. The reaction may be effected at ordinary pressure, high pressure or reduced pressure.

The optical material which is obtained by curing can also take various shapes depending on the application, and there is no limitation as to the shape. For example, a film, sheet, tube, rod, coating film, or bulk shape may be used.

As the molding method, various methods may be adopted such as conventional molding methods for thermosetting resins. For example, molding methods such as a cast method, a press method, a casting method, a transfer molding method, a coating method, an RIM method, and the like may be adopted. As a molding die, polished glass, a polished hard-stainless steel plate, a polycarbonate plate, a polyethyleneterephthalate plate, a polymethylmethacrylate plate, or the like may be used. Moreover, in order to improve releasability from the molding die, a polyethyleneterephthalate film, a polycarbonate film, a polyvinylchloride film, a polyethylene film, a polytetrafluoroethylene film, a polypropylene film, a polyimide film, or the like may be used.

At the time of molding, various processes may be performed as necessary. For example, a process of degassing a composition or a partially-reacted composition by centrifugation or decompression, a process of temporarily releasing pressure during pressing, or the like may be used in order to control the voids which are generated during molding.

In the case of a solution flow method, the composition of the present invention may itself be molded into a film or the like, but it is also possible to dissolve the composition in an organic solvent and use this as a varnish. The solvent to be used is not particularly limited. As specific examples, hydrocarbon-base solvents such as benzene, toluene, hexane, or heptane; ether-base solvents such as tetrahydrofuran, 1,4-dioxane, or diethylether; ketone-base solvents such as acetone or methylethylketone; or halogen-base solvents such as chloroform, methylene chloride, 1,2-dichloroethane can be suitably used. Solvents may be used in the form of mixed solvents of two or more kinds. As a solvent, toluene, tetrahydrofurane, or chloroform is preferable. The amount of solvent to be used is preferably in the range of 0.001 to 10 mL, more preferably in the range of 0.5 to 5 mL, and especially preferably in the range of 1 to 3 mL per gram of reactive component (A) used. If the amount used is smaller, the effects of using a solvent, such as reduced viscosity, may become difficult to obtained. If the amount used is greater, the solvent may remain in the material to cause problems such as thermal cracks, and cost-wise disadvantages may detract from the industrial value.

(Applications)

The composition according to the present invention can be made into an optical material by being previously mixed so as to allow the carbon-carbon double bonds having reactivity with an SiH group to react with some or all of the SiH groups in the composition, thereby causing curing.

The curable composition according to the present invention can be used as a composition for an optical material. As used herein "optical materials" refer to general materials which are used so as to allow light, such as visible light, infrared light, ultraviolet light, X-rays, or laser light, to pass therethrough.

More specifically, in the field of liquid crystal displays, liquid crystal display device peripheral materials such as substrate materials, light guide plates, prism sheets, deflection plates, phase-difference plates, viewing-angle correction films, adhesives, and films for use with liquid crystal, e.g., polarizer protection films, are included. Furthermore, sealants, antireflection films, optical correction films, housing materials, front glass protection films, alternative materials to front glass, and adhesives for a color PDP (plasma display), which is regarded as a promising next-generation flat panel display; LED device molding materials, front glass protection films, alternative materials to front glass, and adhesives for use with an LED display device; substrate materials, light guide plates, prism sheets, deflection plates, phase-difference plates, viewing-angle correction films, adhesives, and polarizer protection films in a plasma address liquid crystal (PALC) display; front glass protection films, alternative materials to front glass, and adhesives in an organic EL (electroluminescence) display; and various film substrates, front glass protection films, alternative materials to front glass, and adhesives in a field emission display (FED) are included.

In the field of optical recording, disk substrate materials, pickup lenses, protection films, sealants, adhesives, and the like for VDs (video disks), CD/CD-ROMs, CD-R/RWs, DVD-R/DVD-RAMs, MO/MDs, PDs (phase change disks), and optical cards are included.

In the field of optical equipment, lens materials, finder prisms, target prisms, finder covers, and photosensitive sensors for still picture cameras; and imaging lenses and finders for video cameras are included. Moreover, projection lenses, protection films, sealants, adhesives, and the like for projection televisions are included. Lens materials, sealants, adhesives, films, and the like for optical sensing devices are included.

In the field of optical components, fiber materials, lenses, waveguides, sealants for elements, adhesives, and the like associated with optical switches in an optical communication system are included. Optical fibers, ferrules, sealants, adhesives, and the like associated with optical connectors are included. Lenses, waveguides, sealants for LED devices, adhesives, and the like for optical passive components, and optical circuit components are included. Substrate materials, fiber materials, sealants for elements, adhesives, and the like associated with optical electric integrated circuits (OEICs) are included.

In the field of optical fibers, illuminations for ornamental displays, light guides, and the like; sensors for industrial use; displays, signs, and the like; and optical fibers for communications infrastructure and for connecting digital devices in households are included.

As for semiconductor integrated circuit peripheral materials, resist materials for microlithography for LSIs or VLSIs are included.

In the field of automobiles and transport vehicles, lamp reflectors, bearing retainers, gear portions, resist coats, switch portions, headlamps, engine internal components, electronic components, various interior and exterior components, driving engines, break oil tanks, automobile rust-proof steel plates, interior panels, interior materials, wirenesses for protection and binding purposes, fuel hoses, automobile lamps, and alternative materials to glass for automobiles are included. Moreover, multi-layer glass for railroad vehicles are included. Moreover, toughness conferrers, engine peripheral members, wirenesses for protection and binding purposes, and resist coats for structural materials of aircraft are included.

In the field of architecture, interior, processing materials, electric covers, sheets, glass intermediate films, alternative materials to glass, and solar battery peripheral materials are included. As for agricultural use, house-covering films are included. As for next-generation photo/electronic function organic materials, organic EL element peripheral materials, substrate materials, fiber materials, sealants for elements, adhesives and the like associated with organic photorefractive elements, optical amplifier elements as light-to-light conversion devices, optical mathematical operation elements, as well as organic solar batteries.

(Particulars When Employing the Curable Composition for a Liquid Crystal Display Device)

A liquid crystal display device can be produced by employing the aforementioned optical material.

In this case, by employing the optical material as a plastic cell for use with liquid crystal, polarizing plates, phase-difference plates, and films for use with liquid crystal, e.g., polarizer protection films, a liquid crystal display device may be produced by usual methods.

(Particulars When Employed as an Optical Material for a Transparent Conductive Film)

The transparent conductive film according to the present invention is a film comprising a transparent conductive layer provided on at least one face of a transparent film composed of a curable composition including the aforementioned components (A) to (C) as essential components. There is no particular limitation as to its thickness, appearance, shape, or the like.

The transparent conductive layer according to the present invention is produced by coating a transparent conductive film such as a thin metal film, a thin semiconductor film, or a thin multilayer film on at least one face of a transparent film; there is no particular limitation with respect to all surface or one face, etc.

Examples of thin metal films include nickel, titanium, chromium, silver, zinc, aluminum, copper, gold, palladium, and the like. Examples of thin semiconductor films include metal oxide films, such as indium oxide, cadmium oxide, and tin oxide to which tin, tellurium, cadmium, molybdenum, tungsten, fluorine, or the like is added as an impurity; and zinc oxide, titanium oxide and the like to which aluminum is added as an impurity. In particular, thin semiconductor films of indium tin oxide (ITO) containing 2 to 15 wt % of tin oxide are excellent in conductivity and are preferably used.

Examples of thin multilayer films composed of dielectric/metal/dielectric include titanium oxide/gold/titanium oxide and the like.

The thickness of the transparent conductive film is preferably 5 to 200 nm. If the thickness of the transparent conductive film is less than 5 nm, it may be difficult to form the film. If the thickness of the transparent conductive film exceeds 200 nm, transparency maybe lowered, and bending resistance may be deteriorated.

Examples of methods for forming such transparent conductive films include a vacuum deposition method, a sputtering method, an ion plating method, ion beam sputtering method, and the like.

As methods for producing transparent films as substrates for transparent conductive films, various methods can be adopted, including conventional molding methods for thermosetting resins.

As materials for the molding die, polished glass, a polished hard-stainless steel plate, a polycarbonate plate, a polyethyleneterephthalate plate, a polymethylmethacrylate plate, or the like may be used. Moreover, in order to improve releasability from the molding die, a polyethyleneterephthalate film, a polycarbonate film, a polyvinylchloride film, a polyethylene film, a polytetrafluoroethylene film, a polypropylene film, a polyimide film, or the like may be used.

On the transparent conductive film according to the present invention, a thin film may be applied in order to confer functions such as gas barrier property, anti-abrasion property, chemical resistance, and the like.

Specifically, various thermoplastic resins; thermosetting resins containing amino groups, imino groups, epoxy groups, silyl groups, and the like; radiation curing resins containing acryloyl groups, methacryloyl groups, vinyl groups, and the like; or mixtures of these resins, to which polymerization inhibitors, waxes, dispersants, pigments, solvents, dyes, plasticizers, ultraviolet absorbents, inorganic fillers, and the like are added, may be applied by methods such as a gravure roll coating method, a Mayer bar coating method, a reverse roll coating method, a dip coating method, an air knife coating method, a calender coating method, a squeeze coating method, a kiss coating method, a fountain coating method, a spray coating method, a spin coating method, and the like. Furthermore, after application, curing via radiation irradiation or thermal curing via heating may be performed as necessary to obtain a cured thin film layer. When printing is performed, methods such as a gravure method, an offset method, a flexography method, a silkscreen method, and the like can be used. In order to confer gas sealing property and the like, a metal oxide layer containing aluminum, silicon, magnesium, zinc, and the like as main components may be provided, where the metal oxide layer is formed by a vacuum deposition method, a sputtering method, an ion plating method, or a plasma CVD method.

It is possible to obtain a multilayer structure with other films. As the method for multilayering, any known and commonly-used method may be used, e.g., thermal bonding methods such as a heat sealing method, an impulse sealing method, an ultrasonic bonding method, a high-frequency bonding method; laminate processing methods such as an extrusion lamination method, a hot-melt lamination method, a dry lamination method, a wet lamination method, a solvent-free adhesion lamination method, a thermal lamination method, and a coextrusion method; and the like. Examples of films to be used for lamination include a polyester resin film, a polyvinyl alcohol resin film, a cellulose resin film, a poly vinylfluoride resin film, a polyvinylidene chloride resin film, polyacrylonitrile resin film, a nylon resin film, a polyethylene resin film, a polypropylene resin film, an acetate resin film, a polyimide resin film, a polycarbonate film, a polyacrylate film, and the like.

Examples of applications of the transparent film according to the present invention include the following:

in the field of display devices: membrane switches, liquid crystal display devices (phase-difference films, polarization films, plastic liquid crystal cells), electroluminescence, electrochromic, electrophoresis displays, plasma display panels, field emission displays, diffusion films for backlight, and color filters;

in the field of recording: static recording substrates, OHPs, secondary masters, slide films, microfilms, and X-ray films;

in the field of optical/magnetic memories: thermoplastic recording, ferroelectric memories, magnetic tapes, ID cards, and bar codes;

in the field of antistatics: windows of meters, cathode ray tubes of television sets, clean room windows, packaging materials for semiconductors, VTR tapes, and dust-proof films for photomasks;

in the field of electromagnetic wave shielding: measurement devices, medical equipment, radiation detectors, IC components, CRTs, and liquid crystal display devices;

in the field of photoelectric conversion elements: windows of solar batteries, optical amplifiers, and photosensors;

in the field of heat ray reflection: windows (e.g., architecture and automoblies), incandescent lamps, windows of cooking ovens, vision lights of furnaces, and selectively transmissive membranes;

in the field of sheet heating elements: defrosters, aircraft, automobiles, freezers, incubators, goggles, medical equipment, and liquid crystal display devices;

in the field of electronic parts/circuit materials: capacitors, resistors, thin film composite circuits, and mounting of leadless LSI chip carriers;

in the field of electrodes: electrodes for paper batteries;

in the field of light transmission filters: ultraviolet-cutout filters, ultraviolet-transmissive filters, ultraviolet-transmissive/visible light -absorptive filters, color separation filters, color temperature conversion filters, neutral density filters, contrast filters, wavelength calibration filters, interference filters, infrared-transmissive filters, infrared-cutout filters, heat ray-absorptive filters, and heat ray-reflective filters;

in the field of gas selective transmission membranes: oxygen/nitrogen separating membranes, carbon dioxide separating membranes, and hydrogen separating membranes;

in the field of electric insulation: insulative adhesive tapes, slot liners for motors, and interphase insulation in transformers;

in the field of polymer sensors: photosensors, infrared sensors, sonic wave sensors, and pressure sensors;

in the field of surface protection: liquid crystal display devices, CRTs, furniture, system kitchens, and automobile interiors and exteriors;

other fields: electrothermal transcription, printer ribbons, electric wire cable shielding, and water leakage prevention films;

EXAMPLES

Hereinafter, examples and comparative examples of the present invention will be described. However, the present invention is not limited to the following.

Synthesis Example 1

Synthesis of bisphenol A diallylether (BPA-AE)

A stirring apparatus and a condenser were set to a 1 L three-necked flask. In this flask, 114 g of bisphenol A, 145 g of potassium carbonate, 140 g of allylbromide, and 250 mL of acetone were placed, and this was stirred for 12 hours at 60° C. A supernatant was taken, and washed with an aqueous solution of sodium hydroxide in a separatory funnel, and thereafter washed with water. After the organic layer was dried with sodium sulfate, the solvent was distilled away by means of an evaporator, whereby 126 g of a pale yellow liquid was obtained. By $^1$H-NMR, this was found to be bisphenol A diallylether, i.e., bisphenol A having an OH group thereof allyletherified. The yield was 82% and the purity was 95% or more.

Synthesis Example 2

Synthesis of Modified BPA-AE

A stirring apparatus, a condenser, and a dropping funnel were set to a 1 L four-necked flask. In this flask, 150 g of toluene, 15.6 µL of a xylene solution of a platinum-vinylsiloxane complex (containing 3 wt % of platinum), 500 g of 1,3,5,7-tetramethylcyclotetrasiloxane were added, and this was heated to 70° C. and stirred in an oil bath. Sixty-four grams of bisphenol A diallylether produced according to Example 1 was diluted with 40 g of toluene, and added dropwise through the dropping funnel. After being stirred for 60 minutes at the same temperature, this was allowed to cool, and 4.74 mg of benzothiazol was added. The unreacted 1,3,5,7-tetramethylcyclotetrasiloxane and toluene were distilled away under a reduced pressure, whereby a relatively viscous liquid was obtained. By $^1$H-NMR, this was found to be a product resulting from some of the SiH groups in 1,3,5,7-tetramethylcyclotetrasiloxane reacting with bisphenol A diallylether(referred to as "partial reaction product A").

Synthesis Example 3

Synthesis of Hydrogenated bisphenol A diallylether (HBPA-AE))

A stirring apparatus and a condenser were set to a 500 mL four-necked flask. In this flask, 6.49 g of hydrogenated bisphenol A (manufactured by Tokyo Kasei Co., Ltd.) represented by the following formula:

243 g of a 50 wt % aqueous solution of sodium hydroxide, 3.54 g of tetra n-butyl ammonium bromide, 20.5 g of allylchloride, and 16.0 mL of xylene were placed, and this was heated and stirred for 5 hours at 60° C., and then 4 hours at 70° C. in nitrogen. The organic layer was separated through a separatory funnel. This was washed one time with 50 mL of 1N hydrochloric acid and four times with 200 mL of water, and dehydrated with magnesium sulfate. The solvent was distilled away by means of an evaporator at 60 to 70° C., whereby a pale yellow liquid was obtained. By $^1$H-NMR, this was found to be hydrogenated bisphenol A diallylether, i.e., hydrogenated bisphenol A having an OH group thereof allyletherified.

Example 1

PB/siloxane

By mixing 1.27 g of 1,2-polybutadiene (B-1000; manufactured by Nippon Soda Co., Ltd.), 1.20 g of 1,3,5,7-tetramethylcyclotetrasiloxane, and 10 µL of a xylene solution of a platinum-vinylsiloxane complex (containing 0.25 wt % of platinum), a composition according to the present invention was obtained.

This was flowed in a can (diameter: 6.7 cm), and its temperature was elevated in an oven from 50° C. to 120° C. over 5 hours, thereby obtaining a transparent film. This was sandwiched between two glass plates, and heated so as to cure for 3 hours at 150° C. in a nitrogen air current (20 mL/minute). The material thus obtained proved homogeneous and transparent by visual inspection, and was tough.

Example 2

PB/siloxane

By mixing 5.08 g of 1,2-polybutadiene (B-1000; manufactured by Nippon Soda Co., Ltd.), 4.80 g of 1,3,5,7-tetramethylcyclotetrasiloxane, and 40 µL of a xylene solution of a platinum-vinylsiloxane complex (containing 0.25 wt % of platinum), a composition according to the present invention was obtained.

This was filled in a glass cell having an interspace of 2 mm, with a polyimide film used as a release film, and cured for 30 minutes at 75° C., 30 minutes at 110° C., and 12 hours at 150° C. The material thus obtained proved homogeneous, colorless, and transparent by visual inspection.

Example 3

PB+VCH/siloxane

By mixing 1.27 g of 1,2-polybutadiene (B-1000; manufactured by Nippon Soda Co., Ltd.), 1.08 g of 4-vinylcyclohexene, 2.40 g of 1,3,5,7-tetramethylcyclotetrasiloxane, and 20 µL of a xylene solution of a platinum-vinylsiloxane complex (containing 0.25 wt % of platinum), a composition according to the present invention was obtained.

This was flowed in a can (diameter: 6.7 cm), and its temperature was elevated in an oven from 50° C. to 120° C. over 5 hours, thereby obtaining a transparent film. This was sandwiched between two glass plates, and heated so as to cure for 3 hours at 150° C. in a nitrogen air current (20 mL/minute). The material thus obtained proved homogeneous and transparent by visual inspection, and was tough.

Example 4

TVC/Modified BPA-AE

By mixing 1.09 g of 1,2,4-trivinylcyclohexane (manufactured by Degussa Huels AG), 2.63 g of modified BPA-AE obtained according to Synthesis Example 2, and 20 μL of a xylene solution of a platinum-vinylsiloxane complex (containing 0.25 wt % of platinum), a composition according to the present invention was obtained. This was flowed in a can (diameter: 6.7 cm), and its temperature was elevated in an oven from 50° C. to 120° C. over 5 hours, thereby obtaining a transparent film. This was sandwiched between two glass plates, and heated so as to cure for 2 hours at 200° C. in a nitrogen air current (20 mL/minute). The material thus obtained proved homogeneous and transparent by visual inspection, and was tough.

Example 5

VCH/Modified BPA-AE

By mixing 2.63 g of 4-vinylcyclohexene (manufactured by Tokyo Kasei Co., Ltd.), 2.63 g of modified BPA-AE obtained according to Synthesis Example 2, and 30.2 μL of a xylene solution of a platinum-vinylsiloxane complex (containing 0.3 wt % of platinum), a composition according to the present invention was obtained. This was flowed in a can (diameter: 6.7 cm), and its temperature was elevated in an oven from 50° C. to 120° C. over 5 hours, thereby obtaining a transparent film. This was sandwiched between two glass plates, and heated so as to cure for 2 hours at 200° C. in a nitrogen air current (20 mL/minute). The material thus obtained proved to be a homogeneous, yellowish transparent solid by visual inspection, and was tough.

Example 6

PB/Modified BPA-AE

By mixing 6.23 g of 1,2-polybutadiene (B-1000; manufactured by Nippon Soda Co., Ltd.), 14.0 g of modified BPA-AE obtained according to Synthesis Example 2, and 147 μL of a xylene solution of a platinum-vinylsiloxane complex (containing 0.15 wt % of platinum), a composition according to the present invention was obtained.

After being degassed for 1 hour under a reduced pressure of about 1 torr, this composition was cast on a PET film as a release film so as to have a thickness of 0.2 mm by using a bar coater. In a nitrogen atmosphere, this was heated so as to cure for 30 minutes at 100° C., and then 15 hours at 120° C. A film was obtained which proved homogeneous and transparent by visual inspection.

Example 7

TVC/Modified BPA-AE

By mixing 6.23 g of 1,2,4-trivinylcyclohexane (manufactured by Degussa Huels AG), 14.0 g of modified BPA-AE obtained according to Synthesis Example 2, and 147 μL of a xylene solution of a platinum-vinylsiloxane complex (containing 0.15 wt % of platinum), a composition according to the present invention was obtained.

After being degassed for 1 hour under a reduced pressure of about 1 torr, this composition was cast on a PET film as a release film so as to have a thickness of 0.2 mm by using a bar coater. In a nitrogen atmosphere, this was heated so as to cure for 30 minutes at 100° C., and then 15 hours at 120° C. A film was obtained which proved homogeneous and transparent by visual inspection.

Example 8

VCH/siloxane

By mixing 7.0 g of 4-vinylcyclohexene (manufactured by Tokyo Kasei Co., Ltd.), 7.8 g of 1,3,5,7-tetramethylcyclotetrasiloxane, and 10.0 μL of a xylene solution of a platinum-vinylsiloxane complex (containing 0.5 wt % of platinum), a composition according to the present invention was obtained. The material thus obtained proved homogeneous, colorless, and transparent by visual inspection.

Example 9

HBPA-AE/Modified BPA-AE

By mixing 1.2 g of HBPA-AE produced according to Synthesis Example 3 and 1.0 g of modified BPA-AE produced according to Synthesis Example 2 (where the modified BPA-AE contained a platinum-vinylsiloxane complex as component (C) according to the present invention as described in Synthesis Example 2), a composition according to the present invention was obtained.

This was flowed in a can (diameter: 4.0 cm), and heated so as to cure for 2 hours at 50° C., 4 hours at 80° C., 1 hour at 120° C., and 19 hours at 150° C. in an oven. The material thus obtained proved to be a homogeneous, yellowish transparent solid by visual inspection.

Comparative Example 1

Using a polycarbonate resin C-1400, manufactured by Teijin Chemicals, Ltd. (average molecular weight: 37000), a film (thickness: 100 μm) was produced, and the optical characteristics thereof were evaluated.

Comparative Example 2

Using a polycarbonate resin C-1400, manufactured by Teijin Chemicals, Ltd. (average molecular weight: 37000), a film (thickness: 3 mm) was produced, and the optical characteristics thereof were evaluated.

Measurement Examples

The optical characteristics of samples obtained according to Examples 1-3 and Comparative Examples 1 and 2 were evaluated.

Retardation:

From the films, test pieces were cut out in a 20 mm×20 mm size. Using a microscopic polarization spectrophotometer (wavelength: 515 nm) manufactured by Oak Seisakusho, Co., Ltd., the angular phase of each test piece under no load was measured at a temperature of 25° C. and a humidity of 50%, and a retardation value was calculated in accordance with the following formula:

$$Retardation=(angular\ phase-90)/180 \times 515$$

Total Ray Transmittance: From the films, test pieces were cut out in a 30 mm×30 mm size. Using a turbidimeter 300A manufactured by Nippon Denshoku Industries, Co., Ltd., measurements were taken at a temperature of 23° C. and a humidity of 50%.

TABLE 1

| Sample | thickness (mm) | total ray transmittance (%) | birefringence (515 nm) (nm) |
|---|---|---|---|
| Example 1 | 0.5 | 94 | <1 nm |
| Example 2 | 2.0 | 93 | 10 |
| Example 3 | 0.4 | — | 2 |
| Comparative Example 1 | 0.1 | — | 12 |
| Comparative Example 2 | 3.0 | 90 | — |

As seen from Table 1, the plastic film liquid crystal display device substrate material according to the present invention has excellent properties of low birefringence and high total ray transmittance as compared to polycarbonate films.

Accordingly, by employing a material composed of the composition according to the present invention, a liquid crystal display device having a high display quality can be produced.

Example 10

After being degassed for 1 hour under a reduced pressure of about 1 torr, the same composition as that of Example 1 was press-molded with a pressure of 3 kg/cm$^2$ for 1 hour at 150° C., by using a crystallized PET film as a release film and using 0.3 mm-thick silicone rubber as a spacer. The material thus obtained had characteristics similar to those of the material obtained according to Example 1.

Example 11

After being degassed for 1 hour under a reduced pressure of about 1 torr, the same composition as that of Example 1 was cast by using a bar coater and using a PET film as a release film. This was heated so as to cure for 30 minutes at 100° C., and then 15 hours at 120° C. A film having a thickness of 180 μm, which proved homogeneous and transparent by visual inspection, was obtained.

Example 12

By mixing 6.23 g of 1,2-polybutadiene (B-1000; manufactured by Nippon Soda Co., Ltd.) and 14.48 g of modified BPA-AE obtained according to Synthesis Example 2 (where the modified BPA-AE contained a platinum-vinylsiloxane complex as component (C) according to the present invention as described in Synthesis Example 2), a composition according to the present invention was obtained. This was flowed on a PET film by using a bar coater whose interspace was set at 170 μm, and heated for 30 minutes at 100° C., and then 15 hours at 120° C. in an oven. Thus, a transparent film having a thickness of 112 μm was obtained.

On this film, an indium tin oxide (ITO) film was formed as a transparent conductive layer by using a sputtering method as follows. Shimadzu Sputtering System HSM-421 was used as a sputtering apparatus, and indium tin oxide containing 90 wt % of indium oxide and 10 wt % of tin oxide was used as a target. After the transparent film as set in the sputtering apparatus, the sputtering apparatus was deaired down to a pressure of 2.1×10$^{-5}$ Torr at room temperature. Next, argon was introduced and sputtering was performed, whereby a transparent conductive film having a thickness of 100 nm was formed, with a surface resistance of 119 Ω/□.

In addition, after the transparent film as set in the sputtering apparatus, the sputtering apparatus was deaired down to a pressure of 3.6×10$^{-5}$ Torr at a temperature of 250° C. Next, argon was introduced and sputtering was performed, whereby a transparent conductive film having a thickness of 100 nm was formed, with a surface resistance of 69 Ω/□.

Example 13

The liquid crystal display device according to the present invention may be as follows, for example.

Figure 1:
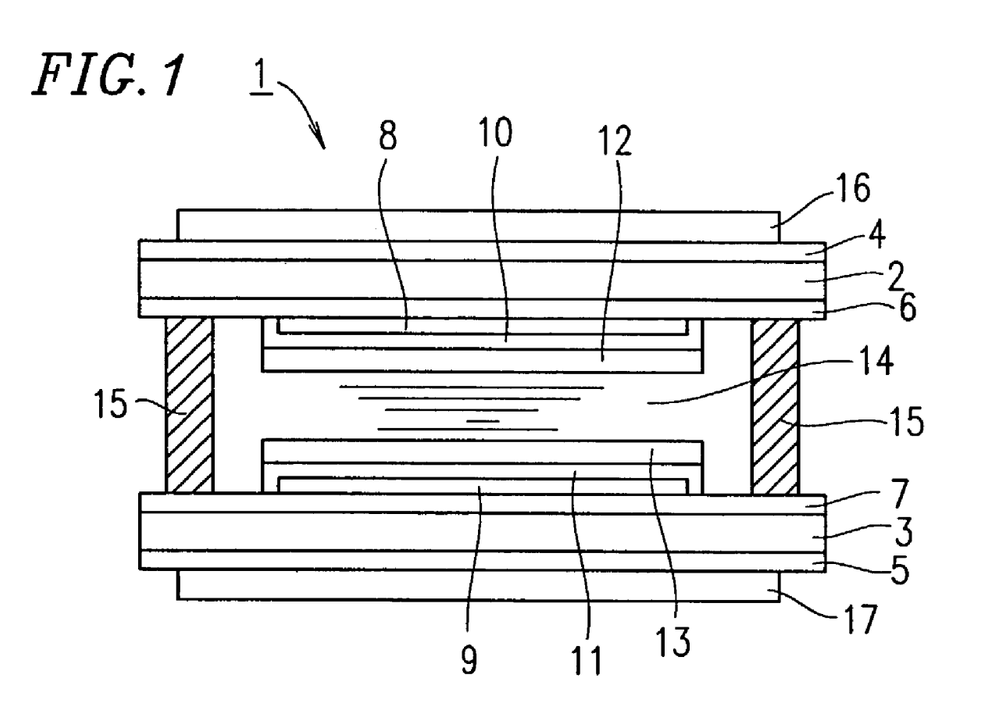
FIG. 1 is a schematic cross-sectional view illustrating a plastic film liquid crystal display device which is produced by using a plastic film liquid crystal display device substrate material according to the present invention.

FIG. 1 is a cross-sectional view illustrating the structure of a plastic film liquid crystal display device 1 which can be produced employing the plastic film liquid crystal display device substrate material according to the present invention.

Referring to FIG. 1, the liquid crystal display device 1 includes a pair of transparent substrates 2 and 3 which have translucency. On the outer surface of the transparent substrates 2 and 3, gas barrier layers 4 and 5 for preventing the entry of gases, such as oxygen or steam, into the liquid crystal layer are formed. The gas barrier layers 4 and 5, which may be optionally formed in the case where a higher level of anti-gas permeability is required depending on the environment used, are formed of polyvinylalcohol or the like.

On the opposing surfaces of the transparent substrates 2 and 3, undercoat layers 6 and 7 of vapor-deposited SiO$_x$ having a thickness of 150 to 1000 Å are formed. Thereupon, transparent conductive films 8 and 9 of ITO (indium tin oxide) are sputter deposited so as to have a thickness of about 1500 Å. Further thereupon, topcoat layers 10 and 11 and alignment films 12 and 13 of polyimide are spin coated or printed so as to have a thickness of about 500 Å.

In a space between the transparent substrates 2 and 3, a liquid crystal material 14 is injected and sealed with a sealing member 15. On the outer surfaces, polarizing plates 16 and 17 are layered. The liquid crystal display device 1 is thus constructed.

Since the plastic film liquid crystal display device substrate material according to the present invention has only a small retardation, the liquid crystal display device has an improved display quality.

INDUSTRIAL APPLICABILITY

A curable composition having a high heat-resistance, a low birefringence, a small coefficient of photoelasticity, a high optical transparency, and toughness can be provided.

By employing this curable composition, an optical material having a high optical transparency and toughness, a method for producing the same, and a liquid crystal display device incorporating the same can be provided.

A transparent conductive film having excellent optical characteristics can be provided.

The invention claimed is:

1. A transparent conductive film comprising a transparent film composed of a cured curable composition and a transparent conductive layer provided on at least one surface of the transparent film, the curable composition comprising:
   component (A), which is an aliphatic organic compound including at least two carbon-carbon double bonds having reactivity with an SiH group within one molecule, wherein said carbon-carbon double bonds having reactivity with an SiH group are present in an amount equal to or greater than 0.005 mol per gram of component (A), wherein the at least two of the carbon-carbon double bonds included in component (A) are vinyl groups or allyl groups;

component (B), which is a compound including at least two SiH groups within one molecule; and component (C), which is a hydrosilylation catalyst;

wherein the Tg of a cured substance, cured from said composition, is 50° C. or more.

2. A plastic film liquid crystal display device comprising a liquid crystal display layer interposed between a pair of plastic film substrates, wherein one or both of the substrates are obtained by curing a curable composition, the curable composition comprising:

component (A), which is an aliphatic organic compound including at least two carbon-carbon double bonds having reactivity with an SiH group within one molecule, wherein said carbon-carbon double bonds having reactivity with an SiH group are present in an amount equal to or greater than 0.005 mol per gram of component (A), wherein the at least two of the carbon-carbon double bonds included in component (A) are vinyl groups or allyl groups;

component (B), which is a compound including at least two SiH groups within one molecule; and component (C), which is a hydrosilylation catalyst;

wherein the Tg of a cured substance, cured from said composition, is 50° C. or more.

3. A plastic film liquid crystal display device according to claim 2, wherein the liquid crystal display layer is of a super twisted nematic type.

* * * * *